US012746986B2

(12) United States Patent
Kron et al.

(10) Patent No.: US 12,746,986 B2
(45) Date of Patent: Sep. 29, 2026

(54) BUMPER DIFFUSER FOR FREIGHT VEHICLES

(71) Applicants: Steven Kron, Pewaukee, WI (US); Eric Kron, Pewaukee, WI (US)

(72) Inventors: Steven Kron, Pewaukee, WI (US); Eric Kron, Pewaukee, WI (US)

( * ) Notice: Subject to any disclaimer, the term of this patent is extended or adjusted under 35 U.S.C. 154(b) by 496 days.

(21) Appl. No.: 17/880,643

(22) Filed: Aug. 3, 2022

(65) Prior Publication Data

US 2024/0367731 A1 Nov. 7, 2024

Related U.S. Application Data

(60) Provisional application No. 63/228,613, filed on Aug. 3, 2021.

(51) Int. Cl.
*B62D 35/02* (2006.01)
*B60R 19/02* (2006.01)

(52) U.S. Cl.
CPC ............ *B62D 35/02* (2013.01); *B60R 19/023* (2013.01)

(58) Field of Classification Search
CPC ...... B62D 25/02; B62D 35/007; B62D 35/00; B62D 35/001; B60R 19/023
USPC ................................ 296/180.4, 180.1, 180.2
See application file for complete search history.

(56) References Cited

U.S. PATENT DOCUMENTS

| | | | | |
|---|---|---|---|---|
| 8,276,972 B2 * | 10/2012 | Domo | .................. | B62D 35/001 296/180.1 |
| 2013/0169000 A1 * | 7/2013 | Reiman | ................ | B62D 35/001 296/180.4 |
| 2020/0023910 A1 * | 1/2020 | Egarter | ................ | B62D 35/001 |
| 2020/0130816 A1 * | 4/2020 | O'Rourke | ............... | B64C 3/546 |
| 2020/0164932 A1 * | 5/2020 | Bradley | ............... | B62D 35/007 |
| 2021/0001929 A1 * | 1/2021 | Baxter | ................. | B62D 35/007 |

* cited by examiner

*Primary Examiner* — Joseph D. Pape

(57) ABSTRACT

The purpose of this device is to reduce the fuel consumption of heavy trucks by improving airflow to the rear of the trailer and reduce suction drag. Rather than restrict airflow to the side of the vehicle, diffusers streamline its aerodynamic profile and allow air to flow smoothly beneath. A large airfoil extending forward from the ICC bumper promotes stable airflow to the aft of the vehicle, reducing turbulence by keeping airflow at a consistent height. Fairings fitted to other structures such as the bumper uprights further shape and stabilize airflow.

25 Claims, 10 Drawing Sheets

FIG. 5a
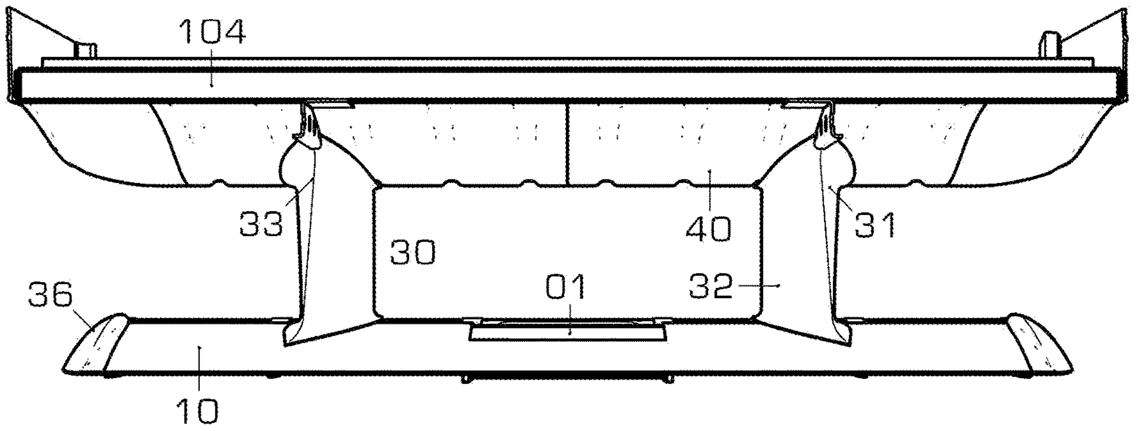
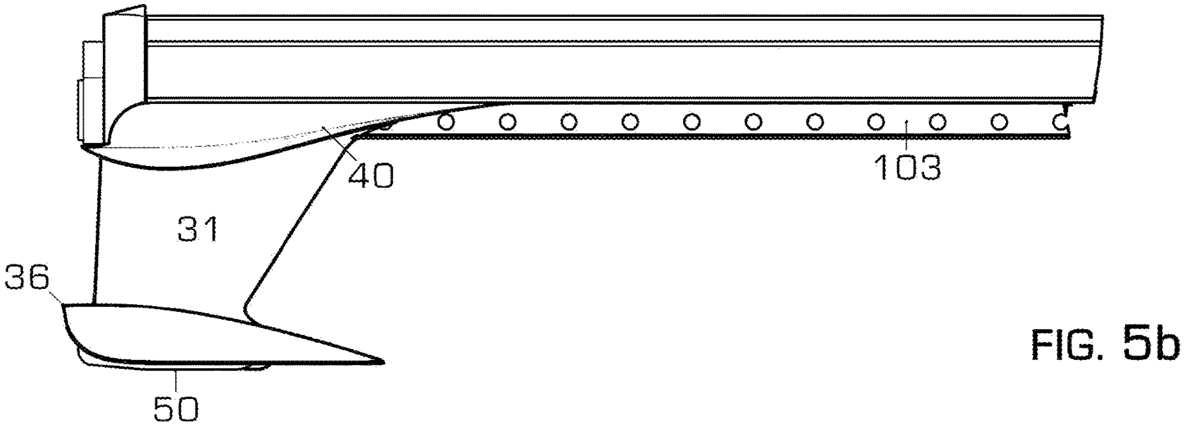
FIG. 5b
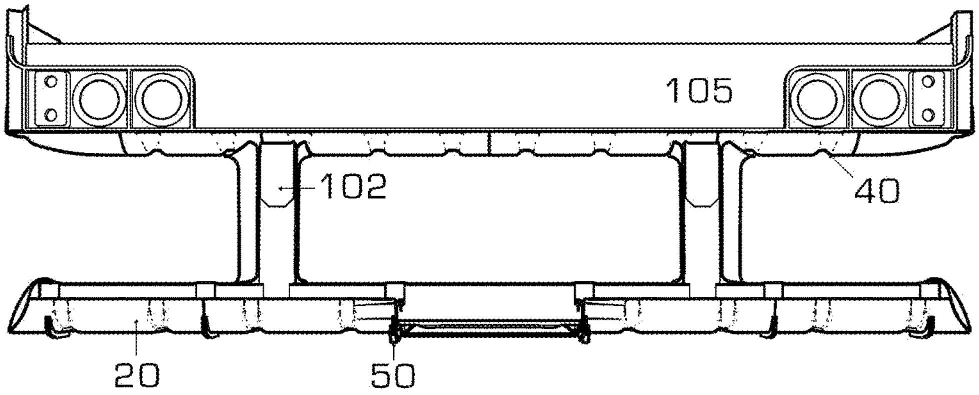
FIG. 5c

FIG. 7a
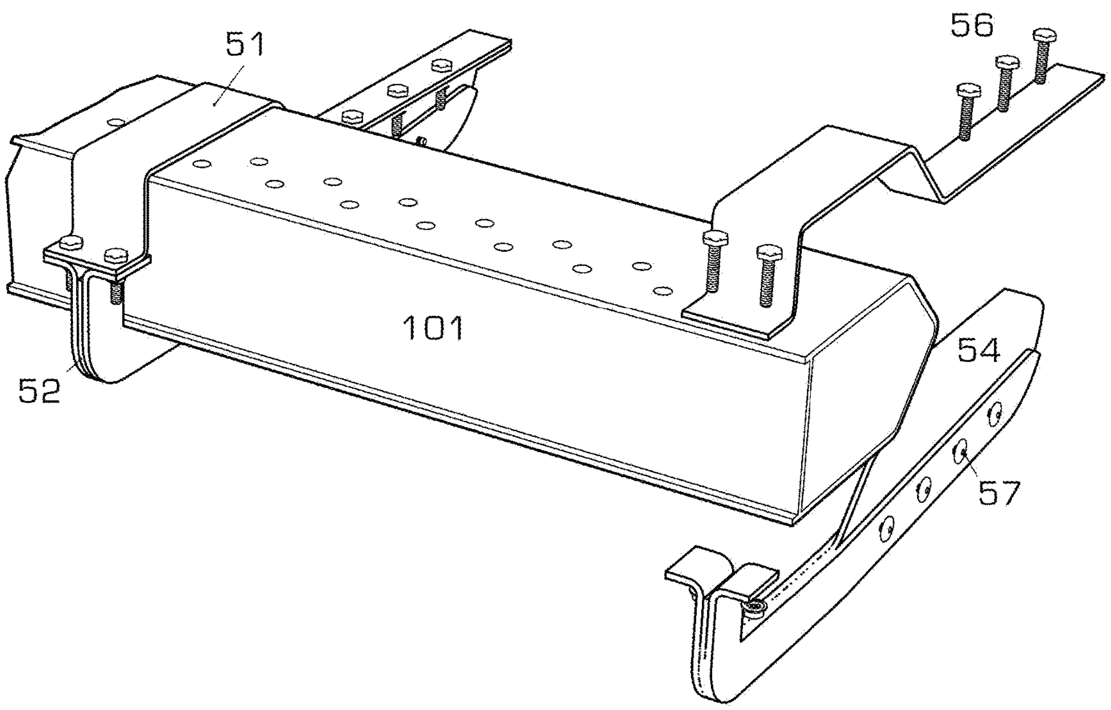
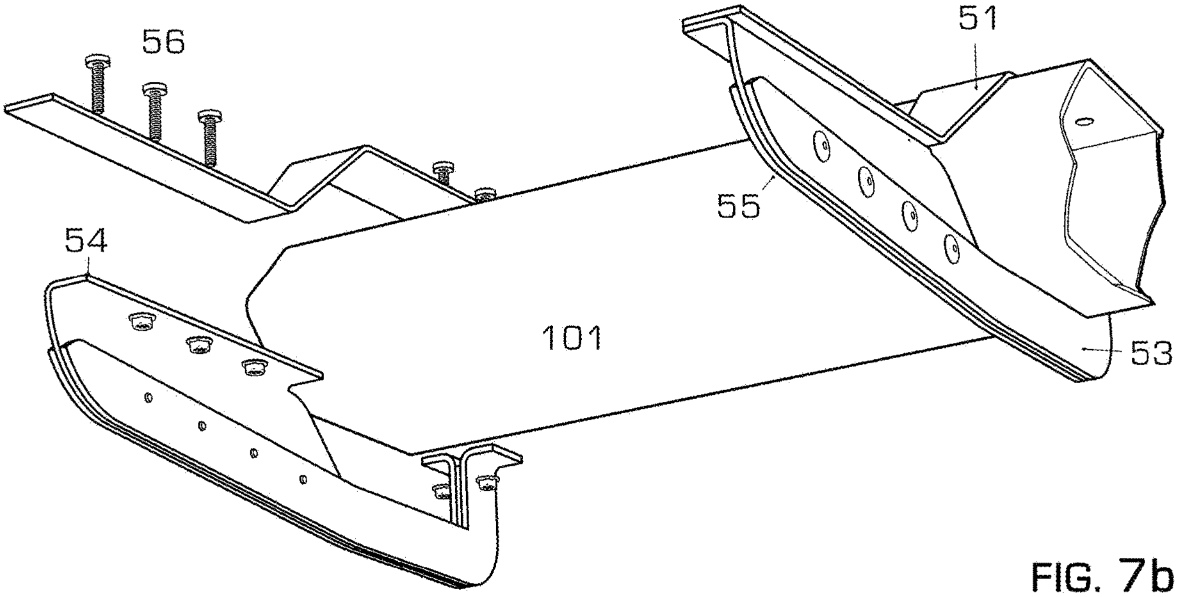
FIG. 7b

BUMPER DIFFUSER FOR FREIGHT VEHICLES

BACKGROUND OF THE INVENTION

Of the factors influencing the fuel economy of semi-trucks, aerodynamics is the field which produces the most practical and profitable improvements. Of the two types of aerodynamic drag—friction and pressure—pressure drag has a particularly significant impact on heavy trucks, accounting for as much as 90% of drag force.

On a standard unmodified tractor-trailer, approximately one third of this pressure drag is caused by the vacuum at the rear of the trailer. When the elements which cause drag are essential structural components, they cannot be removed, displaced, or dramatically altered. Instead, aerodynamic fairings can be attached to the vehicle to improve airflow, thereby reducing drag and consequently fuel consumption.

The Interstate Commerce Commission mandates rear impact guards meet certain standards in the interest of highway safety, but a bumper need not be an aerodynamic deficiency. The major elements of almost any rear impact guard can be retrofitted to yield an aerodynamic advantage. Ideally speaking, these modifications will minimize turbulence while allowing air to flow unobstructed above and below the bumper.

In this case, turbulence stems primarily from air being sucked up into the vacuum left in the wake of the vehicle. An inferior solution would be to keep this air low to the ground by simply blocking the area above the bumper. While this promotes stable airflow on one level, it simultaneously increases the already significant cross-section of a box trailer.

It is possible to overcome this challenge without introducing further aerodynamic deficiencies. A preferred approach is to build a forward extension of the bumper, creating an airfoil that slices through the air as well as minimizing turbulence by blocking upward suction. This airfoil shall be complemented by coverings transforming structural supports into aerodynamic fairings. The resulting invention will have the appearance of an underbody spoiler suspended from vertical strakes.

Along with the major parameter of highway safety and the main objective of aerodynamic efficiency, there is one other factor to take under consideration. A bumper must be able to interface with a dock lock mechanism during pickup and delivery. For the fairing not to interfere with this mechanism, it should be clear of the center bumper and otherwise withstand incidental contact.

BRIEF DESCRIPTION OF THE DRAWINGS

FIG. 5A. Front view of the preferred embodiment.

FIG. 5B. Side view of the preferred embodiment.

FIG. 5C. Back view of the preferred embodiment.

FIG. 7A. Rear view of rigid runners before and after assembly.

FIG. 7B. Front view of rigid runners before and after assembly.

SUMMARY OF THE INVENTION

The invention is a bumper diffuser comprising the following elements: a horizontal airfoil, vertical strakes, and rigid runners, with clearance for a dock lock mechanism. Its main body is the horizontal airfoil, a winglike extension of the bumper with an upper and lower surface forming a contoured wedge. This is capped off on either end by a flat panel or contoured wingtip.

Vertical strakes are formed around the vertical support members to further reduce wind resistance and conduct airflow. For the same reason, it is important to shield the underside of the trailer with flat panels and contoured pieces, covering crossmembers and graduating changes in height.

In addition to aerodynamic efficiency, the design is determined by practical limitations. The airfoil must withstand being dragged along the ground, with a plurality of metal runners protecting less durable plastic and fiberglass elements. It need also accommodate a variety of docking mechanisms which make contact with the bumper, with an opening or door in the center of the airfoil.

DETAILED DESCRIPTION OF THE INVENTION

Figure 1:
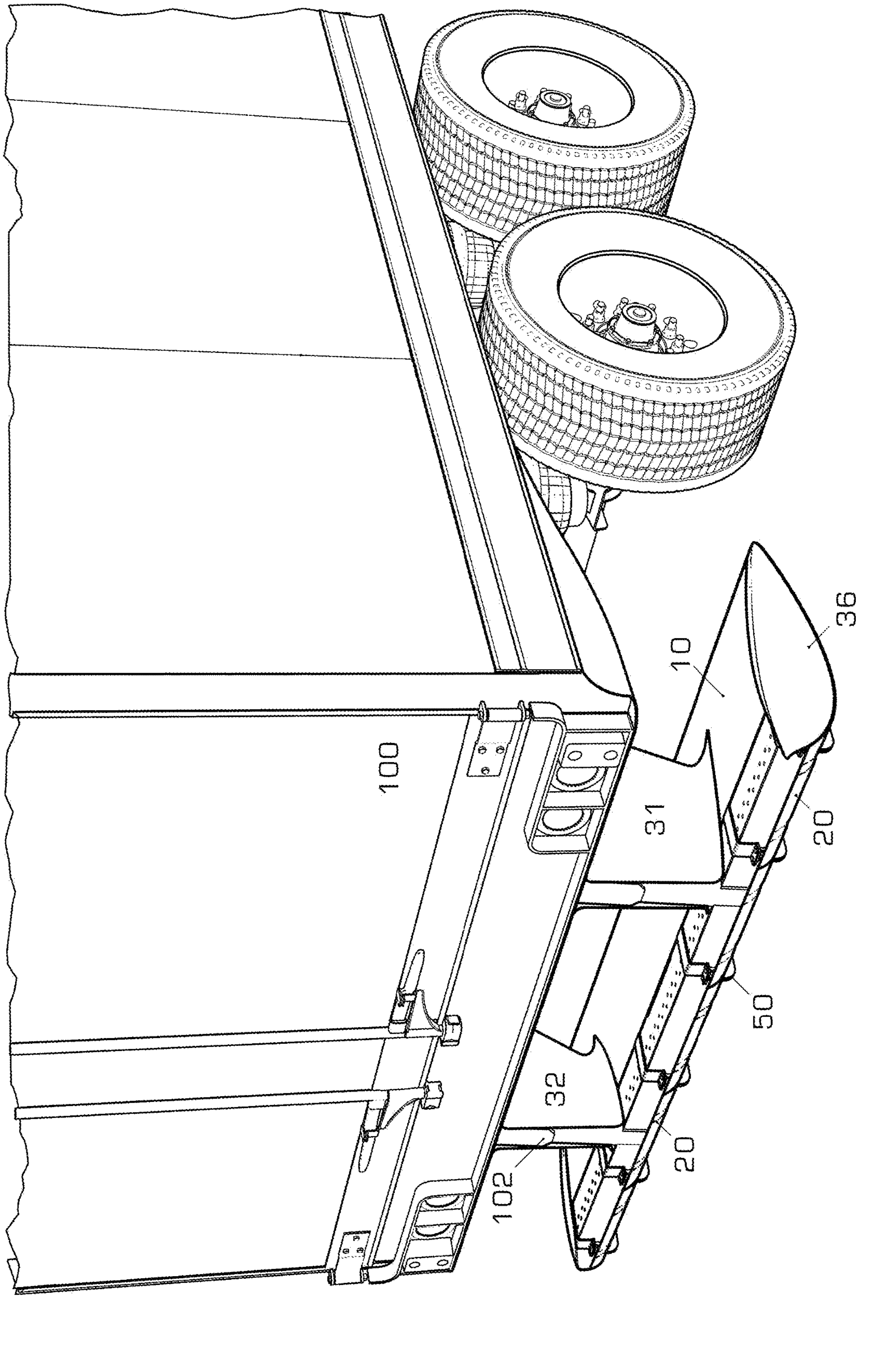
FIG. 1. Rear view of a semi-trailer with bumper diffuser.

A freight vehicle is subject to substantial drag due to the abrupt termination of the trailer walls at its aft, which creates a partial vacuum and causes turbulent airflow. When airflow from underneath the trailer is smooth or stable, suction drag caused by the rear vacuum is exacerbated. By converting the standard bumper 101 of a semi-trailer or other freight vehicle into a diffuser, as shown in FIG. 1, we reduce turbulence resultant from the vacuum left in the wake of the vehicle.

Figure 2:
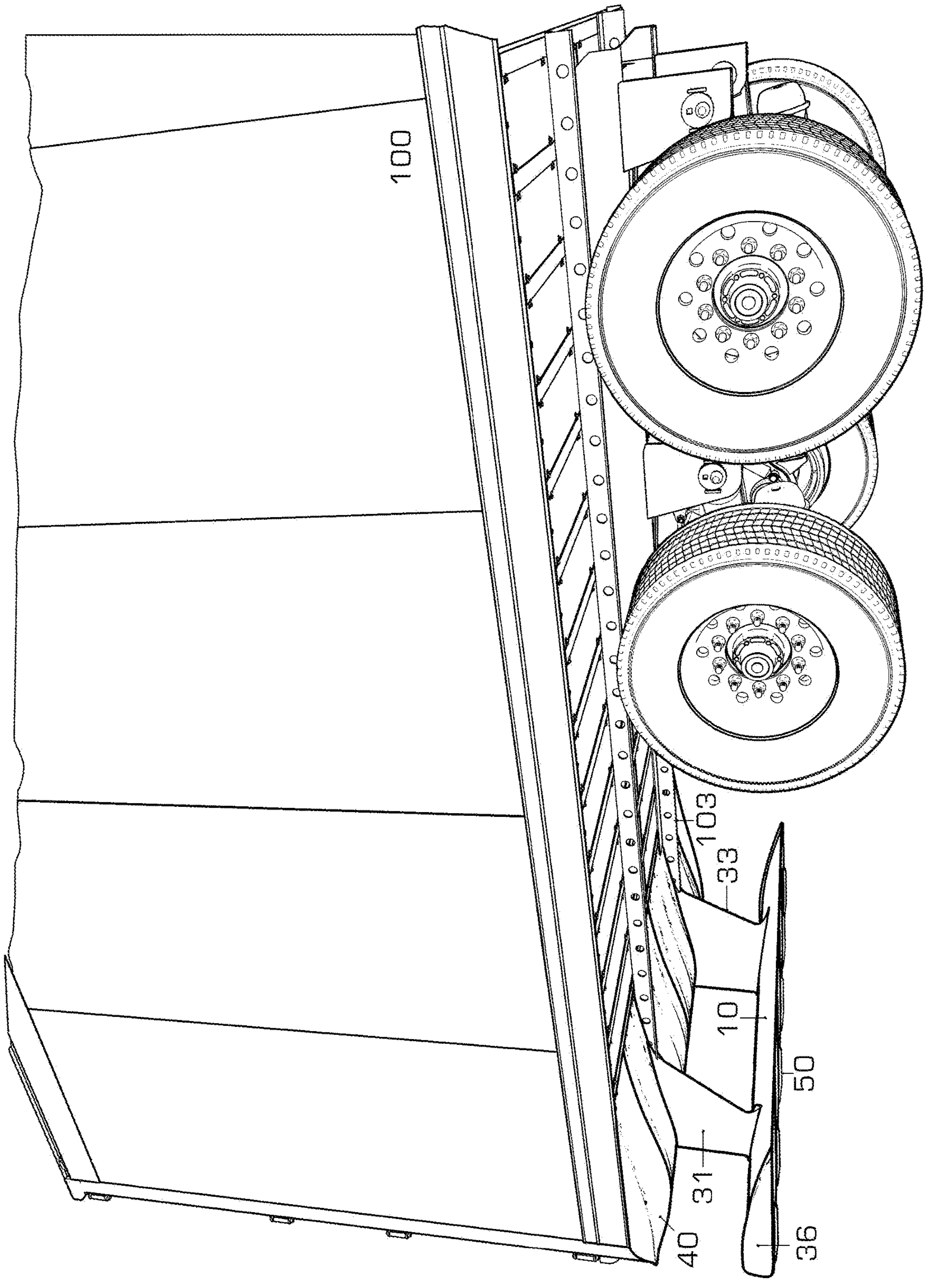
FIG. 2. Underside of a semi-trailer with diffuser mounted to the bumper.
Figure 3A:
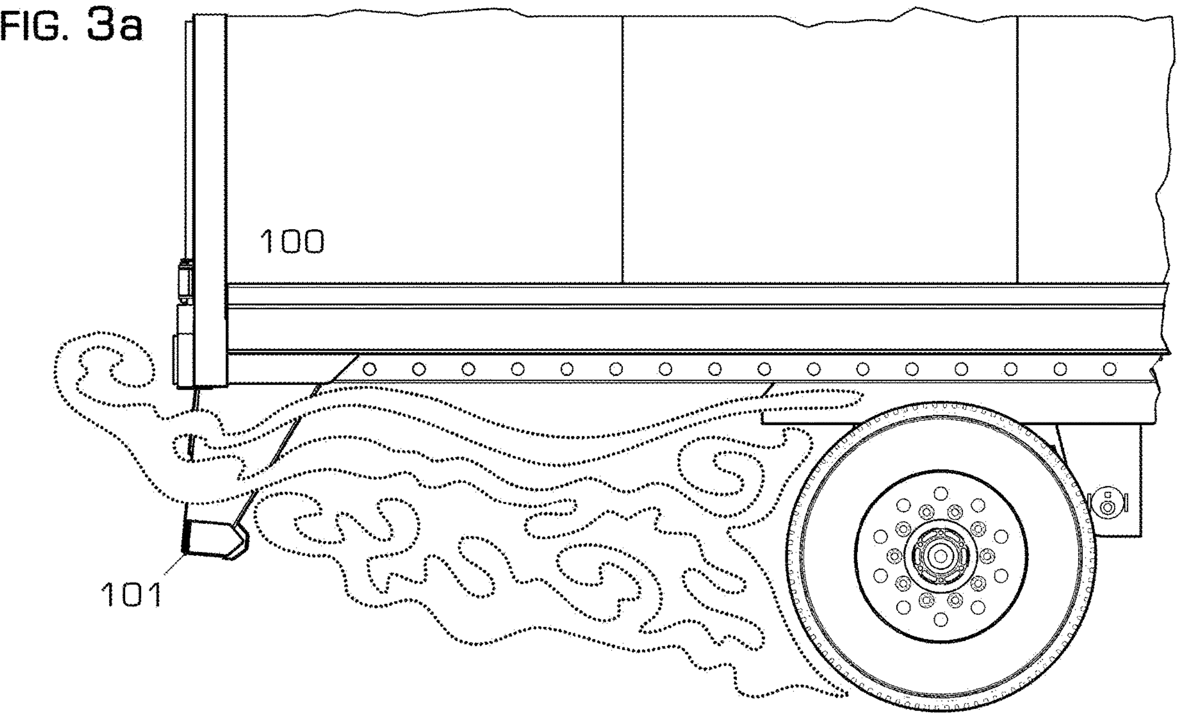
FIG. 3A. Turbulent airflow beneath an unmodified trailer.

Airflow along the very underside of the vehicle 100 such as that in FIG. 2 will be parallel to the path of the trailer. While it is affected by the rear vacuum, the effect of this pressure differential is to pull air directly backward, a desirable outcome which does not generate additional turbulence. The nearer air is to the road surface the more dramatically its flow path will be altered by the rear vacuum. It is pulled upward into the vacuum, causing turbulence which spreads to the volume above it as illustrated in FIG. 3A.

Figure 3B:
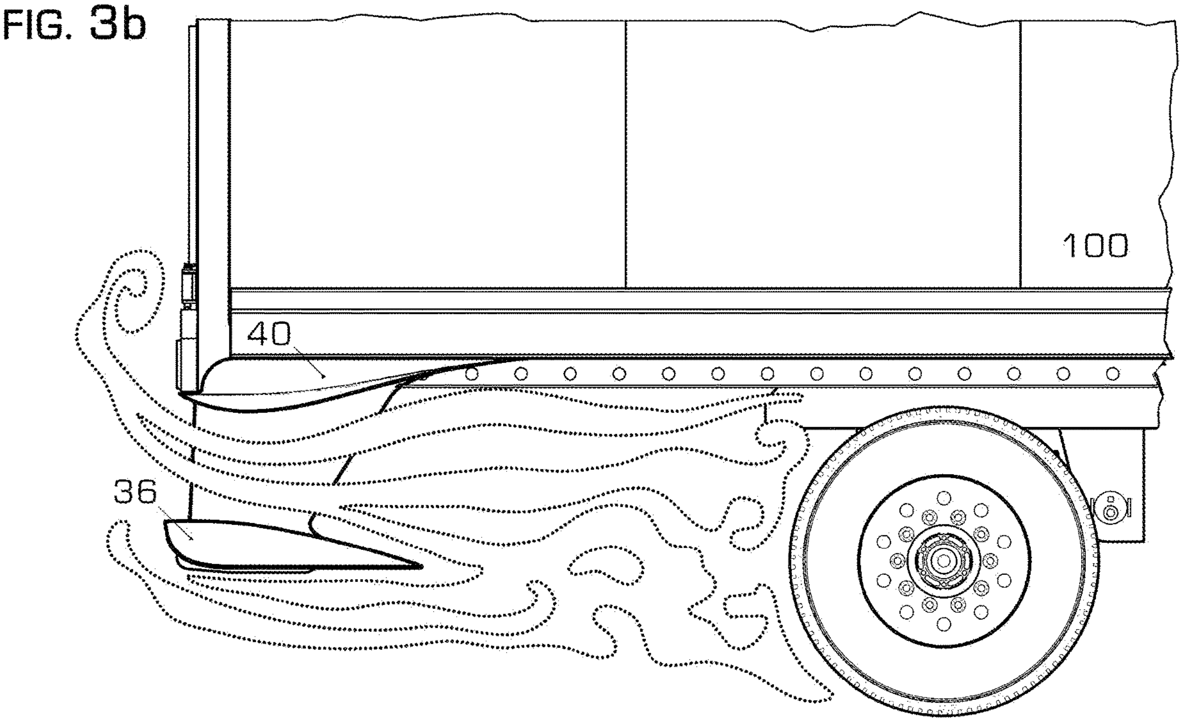
FIG. 3B. Stable airflow around a bumper diffuser.

This turbulence can be prevented by limiting the effect of this vacuum on the lower volume of air. A sufficient forward extension of the bumper will shield this airflow volume from suction force. And yet it will allow the upper volume of air less radically impacted by the vacuum to flow normally, with the added benefit of not being influenced by turbulent air rising from below as shown in FIG. 3B. The lower volume of air is still affected by the vacuum, but it is pulled upward into the smooth surface of the fairing, promoting laminar flow.

This forward extension of the bumper constitutes the main body of the diffuser. The upper surface of directionally flexible fiberglass composite 10 curves gradually upward from the leading edge towards the bumper. More specifically, an 8'×4' sheet of fiberglass composite is cut in half lengthwise and placed at the end of the bumper. The desired curve will naturally form due to its directional flexibility. Fiberglass composite sheets are used in many of the inventor's aerodynamics applications and offer outstanding resilience and reliability.

Such a sheet will supply suitable strength, but ⅛ inch fiberglass is not flexible enough to create the preferred curve for the bottom surface. Instead, a plastic sheet of 5/32 inch thick vacuum formed to the designated contour, is the ideal solution. Rather than a single sheet stretching all the way across the underside of the bumper, the plastic underside 20 is composed of duplicate segments. The repeated segments improve feasibility of both manufacture and repair.

Much of this bottom surface 20 is substantially flat, possibly parallel to the pavement, as shown in FIG. 5B, but the trailing edge arcs upwards towards the vacuum. The rear portion of this surface must be curved to make this change in direction as natural as possible. In addition to achieving these curves, molded plastic is expected to sustain minor impacts better than fiberglass composite.

Figure 4:
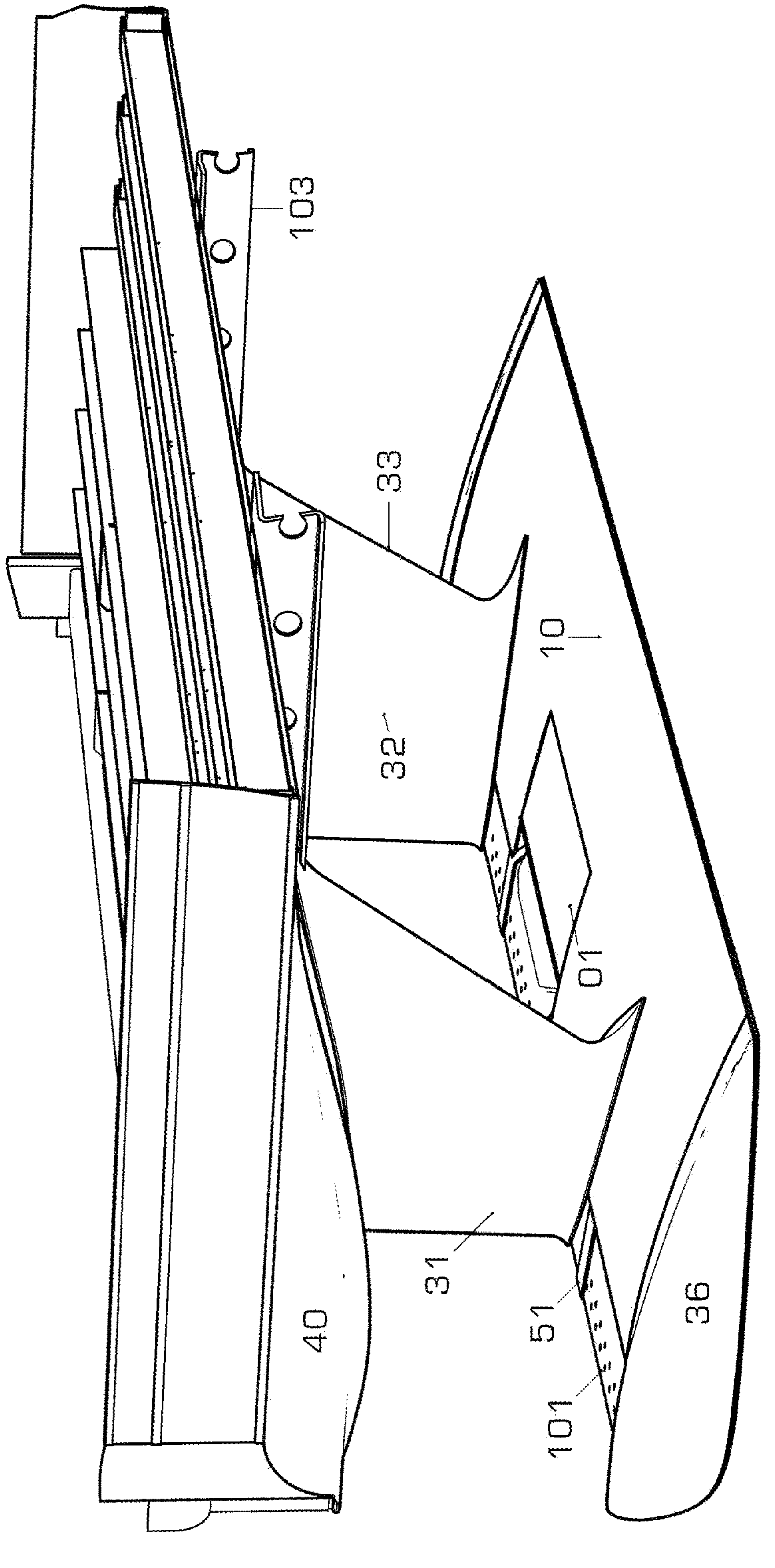
FIG. 4. Perspective view of the preferred embodiment.

With only a top and bottom surface, this leaves the end of the bumper and the inside of the fairing exposed. Any measure taken to cover this hole will improve aerodynamic efficiency. A simple flat panel would be suitable, but a contoured wingtip 36 as shown in FIG. 4 is preferrable. As in FIG. 5A, these forms may protrude a few inches to the side, since the bumper is just under 8 feet wide and does not span the entire trailer. Being a bulbous form, the extent to which wingtips 36 protrude is proportional to the varying height of the airfoil. This compound contour could be fabricated from fiberglass, but to better sustain damage, vacuum formed plastic is once again preferred.

The main body of the diffuser is in essence an inverted airfoil. A traditional airfoil has a rounded front surface and tapers to a terminating edge, designed to create a pressure differential and generate lift. In this case, lift is not necessary, so a narrow leading edge is favorable. This allows the diffuser to slice through volumes of air with maximum efficiency.

Given the bulk of a bumper and its primary purpose of highway safety, it is not practical or preferrable to outfit this diffuser with the tapered terminating edge of an aircraft wing. Another aspect of this inversion is that air is meant to flow upward from the diffuser instead of directly back. Accordingly, it should be contoured around the bumper, with the bottom surface 20 curving upward to ease the transition beyond the diffuser and into the vacuum.

Ultimately, the objective is for air to be directed smoothly into the vacuum, so where it is not prohibited by some structural obstruction it will be advisable to guide airflow upward. A substantially flat bottom will cause the least disturbance to the air underneath as it does not impose any changes in direction. Air which passes along the top side is pitched slightly upward, causing it to flow as smoothly as possible into the vacuum.

Similar methodology is applied to the underside of the vehicle in smoothing the drop from crossmembers 104 to buckplate 105. A gradual concave to convex curvature allows the air to change height and direction without causing excess turbulence. In the lowest profile configuration, airflow is level as it clears the trailer. Embellishing this curvature creates a slight upward pitch towards the rear of the vehicle.

Given the large obstruction of the vehicle suspension, which furthermore may be enclosed by aerodynamic treatments, it is expected that the top middle segment nearest the underside of the trailer will have the least airflow. Taking this into account, it may be advantageous to fill the relative void with the more dramatic curves, profiles extending measurably below the height of the box and at the outside edge this might be too extreme. Within the central segment already defined by the vertical strakes, however, it will smoothly pitch the air upward without any effect detrimental to aerodynamic cross-section.

The other major components of the diffuser, vertical strakes, extend from the upper surface 10 of the airfoil to the underside of contoured coverings 40. With a narrow leading edge graduating rearward, their wedgelike profile is not unlike the inverted airfoil that constitutes the main body of the diffuser. These tapered deflectors 30 are purposefully shaped to reduce wind resistance and conduct airflow by smoothly shrouding support structures.

If the most straightforward approach is taken, strakes 30 may consist of a substantially flat outside surface 31 and similarly flat inside surface 32. If they are made to simply extend directly from bumper uprights 102 to a terminating edge 33 then they may be built from flat sheets of flexible materials. This is sufficient to meet the objectives of the invention, but a design more finely tuned to the structure of the upright can produce a streamlined profile and enable increased efficiency.

The configuration of at least two vertical support members 102 varies between manufacturers, but one aspect that is common in their design is an outside to inside bend. In other words, the rear flange of the upright is nearer to the center of the trailer compared to its front flange, which bends outward towards the side. This outside to inside contour is ideal for the tapered deflectors 30, which will guide air towards middle of the trailer to better fill the rear vacuum.

Specifically molded pieces 31 and 32 are designed to fit as tight as possible to the bumper upright while exhibiting fluid contours, as shown in FIG. 5. Their leading edge aligns with the slider suspension track 103, splitting the airflow volume where there is existing division. In the interest of allowing more air to the center, the leading edge of the strake is angled longitudinally to minimize its profile and laterally to widen the extent of the central airflow channel.

The outside to inside gesture manifests as an outside surface which arcs uniformly and an inside surface that transitions from curved to straight. Were it not for the alignment of the leading edge to the suspension track 103, the outside 31 and inside 32 surfaces might be approximately opposite, with the outside surface starting straight and ending in a rearward curve, just as the inside surface begins with a smooth curve and graduates to a straight line.

A specifically molded piece also allows for the introduction of compound curves into the design of the vertical strakes. For example, fillets along the top and bottom of the strake 30, which facilitate smooth transitions between the separate segments of the diffuser. These flared contours will not only improve aerodynamics, but form surfaces through which the deflectors 31 and 32 can be mounted to the upper surface 10 of the airfoil and the underside of contoured covers 40. These pieces are then fixedly attached to other pieces of the diffuser itself rather than to the bumper or its vertical support members. In the instance where the terminal surface of the strake is perpendicular to the airfoil, an aluminum angle could be implemented as a substitute mounting surface.

A variety of materials could be used to fabricate this element, from fiberglass to vacuum formed plastic. Given the bladelike contour of the strake, and for ease of installation, it will likely need to be manufactured in separate halves 31 and 32 and fused along leading edge.

While the molded plastic found in automotive applications is surprisingly resilient, able to sustain impact and return to its original shape, it is still advisable to protect the underside of the diffuser from impact. Not only will a bumper sustain incidental collisions with the ground—the farther forward the slider suspension the likelier bumper 101 will be dragged along uneven terrain—it makes regularly scheduled contact with dock locking systems. In cases where this is not the typical hook but includes a large plate or other unexpected element, rigid runners will help protect the underside of the diffuser against damage.

As the runners protrude from the underside of the diffuser in much the same manner as strakes, their aerodynamic effect will be similar, bisecting air to limit turbulence within its volume. However, the runners may protrude less than an inch and still fulfill their primary function. Given their limited extent, their aerodynamic impact will be minor.

These runners can be attached to the bumper in a variety of ways. A bumper is already welded in many places as part of the assembly process and will accommodate additional welds. With that said, it is preferrable to minimize permanent alterations to the bumper. Although it might be desirable to place the odd rivet or bolt to further fasten the fairing, it is possible to mount each element without directly attaching it to the bumper at any point. Instead, surfaces clamped around the bumper can not only protect the airfoil from damage but serve its substructure by offering series of secure mounting points.

This runner 50 is held in place entirely by clamping force, with bolts securing the top surface 51 and bottom elements 52 together. Top element 51 is a strip of metal which has been bent to fit flat over the top half of the bumper, as shown in FIG. 7A, with another bend and additional length forming a forward protrusion. Along with a rear flange, this forward protrusion is the surface through which the top and bottom elements are joined.

The bottom element is a flat piece of metal 53 cut to fit around the bumper as shown in FIG. 7B and placed perpendicular to its surface, with a 90-degree bend forming the front flange. Its rear flanges are formed from complementary cutouts 53 and 55, flat pieces of metal with a 90-degree bend at the back end. While front and rear flanges could be incorporated into the same element for a simple two-piece clamp, there are a number of reasons a third or fourth part is advantageous.

As with the primary part of the bottom element, the supplementary pieces are cut from sheet metal. Their contours coincide with the larger piece, but they have significantly less surface area and consequently reduced weight. This limits the bulk of the runner while offering increased strength and expanded width. All of these attributes are beneficial in the event of a collision or other incidental contact, with a widened runner being more resistant to damage while placing less pressure on external objects. Furthermore, adding an additional piece creates another connection point and offers redundancy in the event of metal fatigue or part failure.

After these pieces have been fabricated, they are assembled as follows. The central bottom element 54 with forward flange is sandwiched in between two lateral elements. Either lateral element has the same shape but an opposite 90-degree bend for the rear flange. These pieces are secured together with rivets 57 along the bottom length. Once the bottom assembly 52 is completed, it can be situated along the underside of the bumper. With the top element 51 placed over it, they can be joined together and clamped in place with bolts 56 running through the front and rear flanges.

Once the runners are secured in place, they offer a variety of connection points to which the fairing can be attached. This is done entirely without cutting slots, drilling holes, making welds, or performing other permanent alterations to the bumper. Nevertheless, this method should yield the strength and sturdiness necessary for installation and function.

Figure 8A:
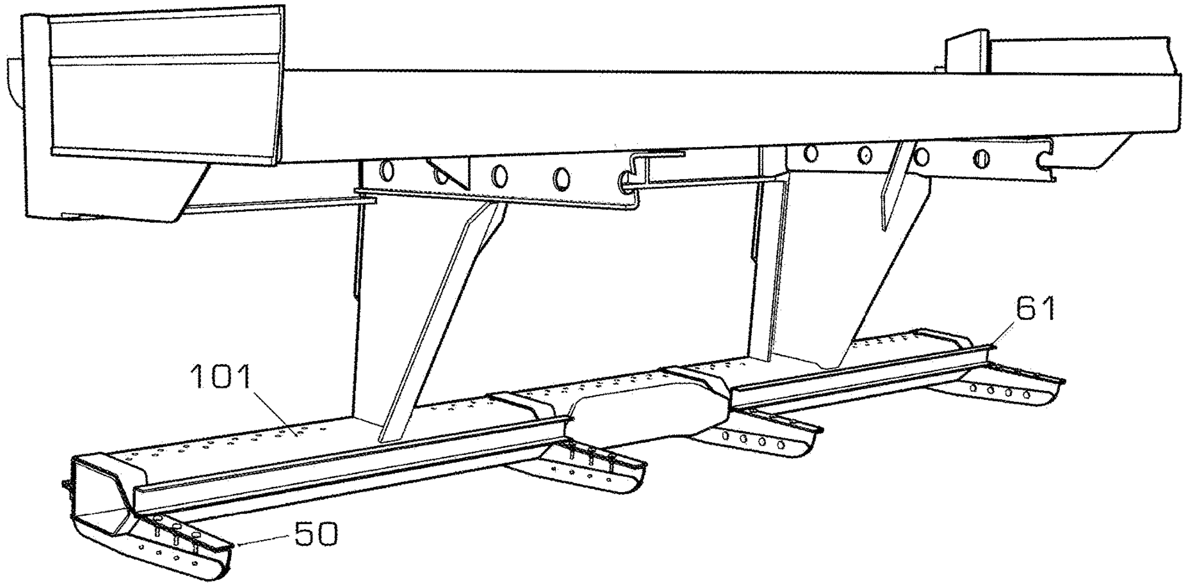
FIG. 8A. Internal structure of diffuser airfoil. Rear impact guard with rigid runners installed.

Square tube 61 spanning the distance from clamp to clamp will form the basis of this additional substructure, as illustrated in FIG. 8A. Firstly, it provides an extended surface to which the top panel can be mounted. It is positioned near the end of the bumper where the fiberglass sheet would have been riveted directly to its surface. As the rivets remain in relatively close proximity to the edge of the sheet, this revised method achieves similar hold down.

Figure 8B:
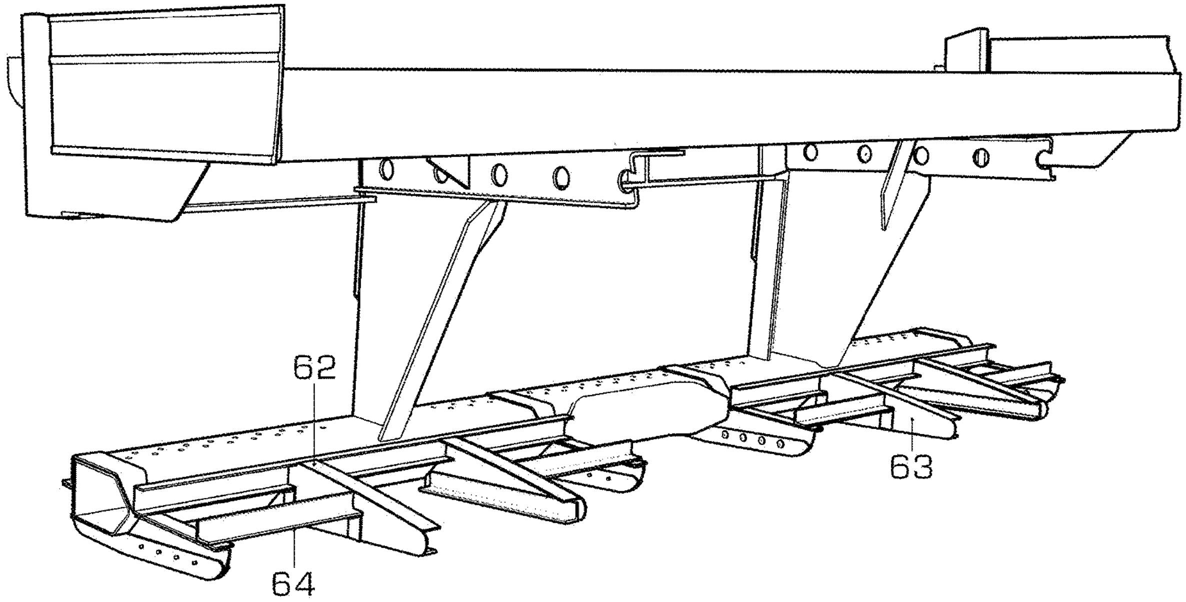
FIG. 8B. Internal structure of a diffuser airfoil with rigid runners and cross-sectional ribs having crosswise reinforcements.

This square tubing 61 also forms the foundation for a plurality of ribs 63, similar to those in an aircraft wing, to be attached as in FIG. 8B. While these ribs could be forged from sheet metal in the same manner as the runners, a simpler fabrication process with more lightweight material may be desirable. From the same fiberglass composite material used for the top panel, cut contours corresponding to the profile of the airfoil which will reinforce and retain the desired shape. Strips 62 of this same material attached along contour via aluminum angles 64 create additional mounting surfaces for the outside panels.

Angles along the bottom edge of these ribs provide a mounting surface for the underside panel 20. It should be noted that the underside panel could be similarly attached to the runners, except that these must protrude from the underside of the airfoil. As such, the angle mounting surface would not be place at the bottom edge of the runner and instead be placed at an appropriate height.

Additional angles or tubing may be used to further strengthen the substructure, as shown in FIG. 8B. With each addition, the substructure becomes increasingly strong. The effectiveness of this support structure will also be bolstered by the elements attached to it. In particular, an upper panel of fiberglass composite 10 is sturdy enough to mount on its own but united with the other pieces forms a whole stronger than any element individually. Much like a semi-trailer, the airfoil achieves strength and stability through a harmony of simple parts.

The previously described elements should be common to most if not all variants of the invention, but there are a wide variety of options that must be taken into consideration. Some of these variations are just to account for differences in bumpers by other manufacturers, but the majority are designed to accommodate a gap in the middle of the fairing that a dock lock mechanism can clear to interface with the bumper. These mechanisms likewise have a wide variety of implementations but can be summarized as a hook, latch, or plate which swings up from the base of a loading dock to secure the trailer.

Figure 9A:
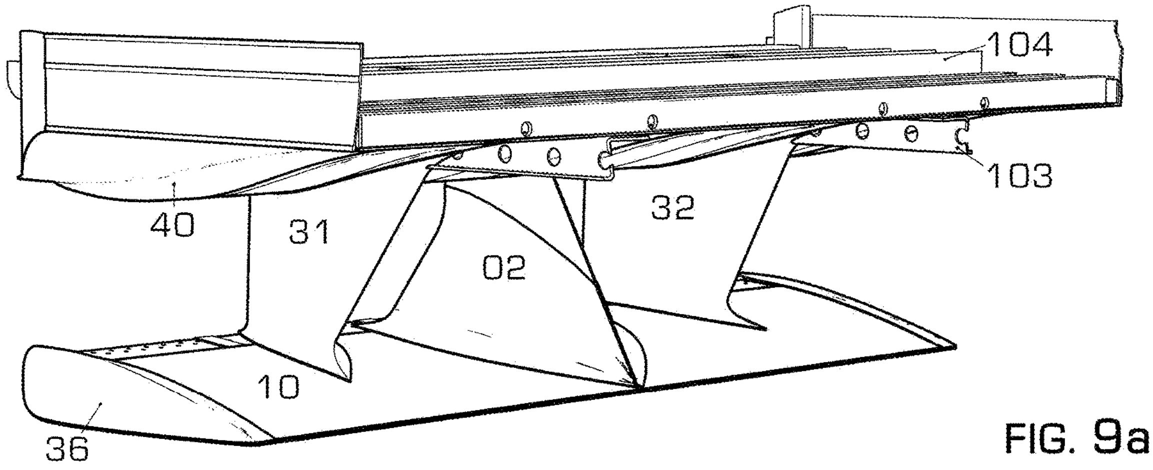
FIG. 9A. Perspective view of diffuser configuration with contoured coverings over an open bottom.

The designs adapted to this purpose fall into three major categories, these being a trap door 01, a contoured cover 02, or flanked gap 03. Examples of these designs can be seen in FIG. 6, FIG. 9, and FIG. 10, respectively. While each of the designs should be equally able to accommodate a dock lock, there are several reasons for choosing one over the other. For example, one may be more aerodynamic, another might be easier to manufacture, or it might have fewer moving parts that complicate assembly and reduce durability. All represent a significant improvement over an unmodified bumper and, indeed, other aerodynamic treatments.

The most direct solution to the dock lock dilemma is to create a hole in the center of the fairing. This alone is sufficient to facilitate function and such a minor modification will not offset otherwise major mileage gains from the fairing. Of course, a simple hole can be improved upon. The first step is to cover the inside wall of the hole, if for no other reason than to prevent dirt and debris accumulation. The outer surface of the fairing can also be restored by covering the hole with a simple hatch or trap door.

This trap door can be as basic as a small sheet of fiberglass attached to the top of the airfoil with a piano hinge. As it hinges away from the bumper, it would be easily pushed out of the way and never inhibit the operation of a dock lock. Depending on the size or shape of the hole, and the dimensions of the door, it may simply rest in place on surface of the fairing.

A more effective and reliable option is a hatch which spans the full height of the airfoil. As with the rest of the fairing, it can be made with fiberglass composite and molded plastic, reinforced by a metal substructure. It must have a rounded front surface so that it can freely rotate. A back end comprising an aluminum angle or square tube strengthens the structure and absorbs impact. While the bulk of this hatch would not necessarily disqualify a piano hinge, a more robust mount could be implemented.

Instead of rotating from the top or bottom surface of the fairing, this hatch will rotate from the center. Suspended between the medial runners, the hatch is attached through a pillow block bearing via a pipe with end caps. This configuration allows it to rotate freely when in contact with a dock locking mechanism, but the hatch need only rotate upward. To limit the effect of gravity and prevent it from rotating downward, a protrusion of the hatch will rotate into a protrusion of the support structure.

Figure 6A:
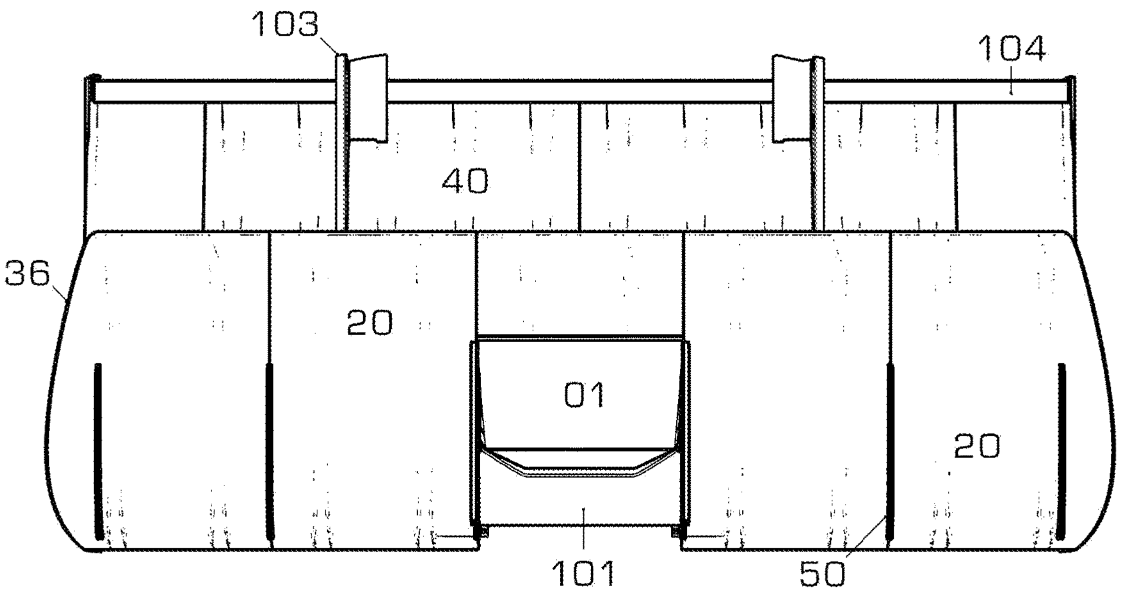
FIG. 6A. Bottom of the preferred embodiment, with closed hatch.
Figure 6B:
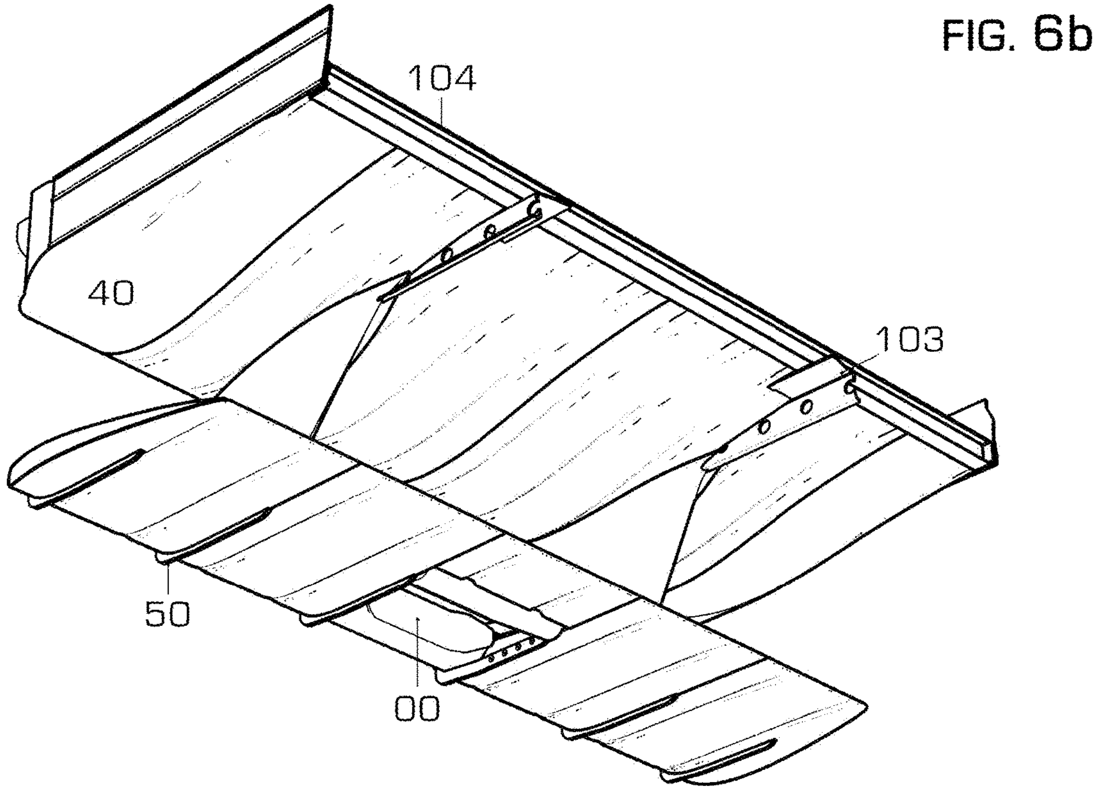
FIG. 6B. Underside of the preferred embodiment, with hatch open.

With the hatch in its resting position as in FIG. 6A, the fairing is aerodynamically almost identical to one with no hole at all. With it raised into docking position as in FIG. 6B, it easily accommodates the action of any dock locking mechanism. Another advantage to this configuration is that it is housed internal to the structure of the fairing, preventing a stray element from causing interference or sustaining damage.

Figure 9B:
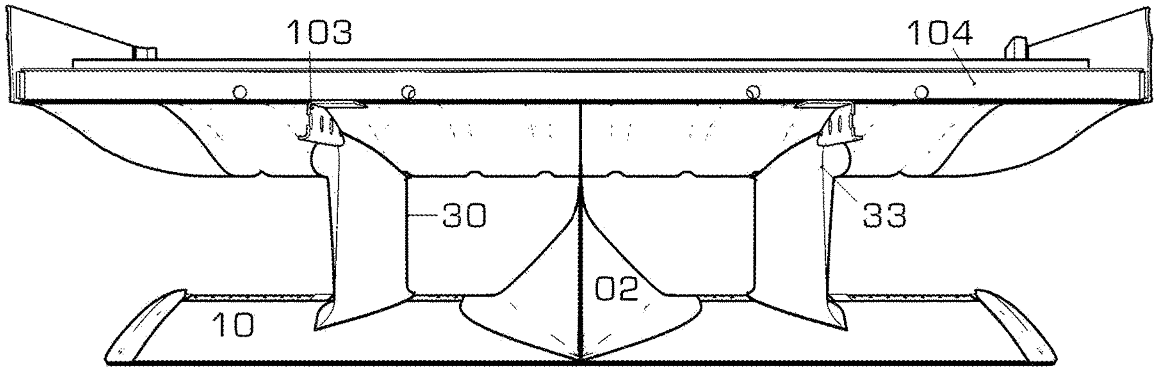
FIG. 9B. Front view of diffuser configuration with contoured coverings and central strake.
Figure 9C:
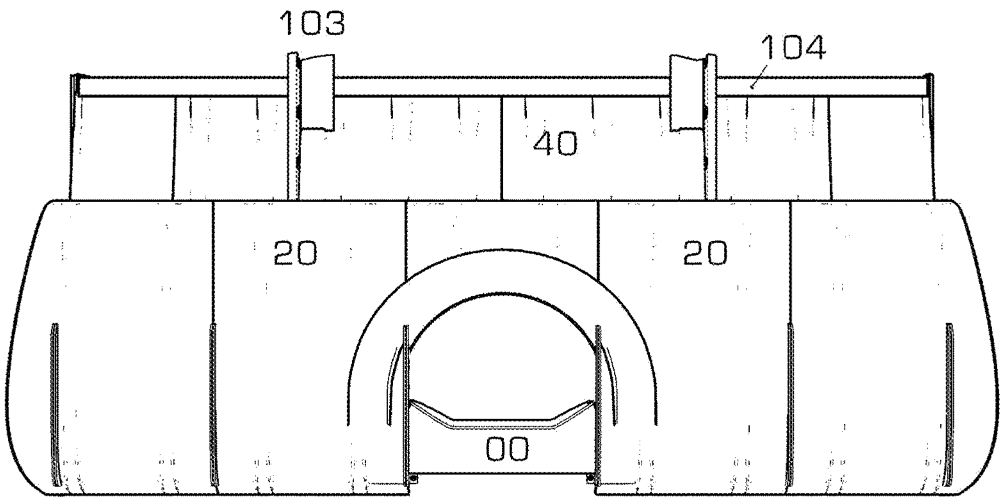
FIG. 9C. Bottom view of diffuser configuration with open underside.
Figure 10A:
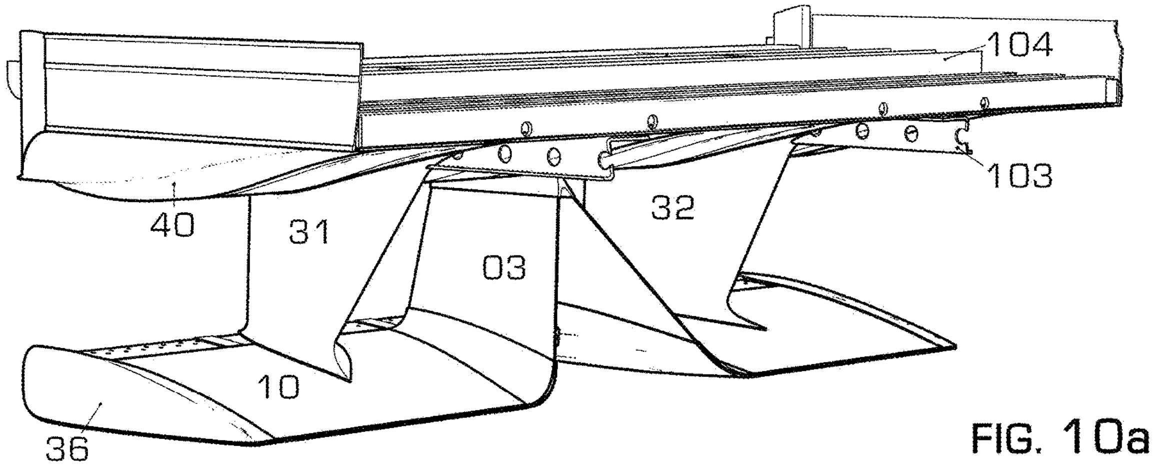
FIG. 10A. Perspective view of diffuser configuration with angled strakes around central opening.

An outward extension of a center strake, illustrated in FIG. 9B, can altogether eliminate the need for moving parts. Contoured covers allow air to pass smoothly over the hole shown in FIG. 9C and despite being static allow a dock lock sufficient space to operate. Furthermore, this configuration adds little bulk to the rear cross-section, so it will not significantly expand the vacuum volume. Indeed, air will pass through from the underside as well and this suction force may draw air favorably towards the center.

As with the rest of the invention, this contoured cover is designed to slice through the air directly air smoothly upward on its way to the rear vacuum. At the front of the contour, where no clearance is required, it is sharply pointed. Approaching the rear, it graduates towards a wider angle, allowing the dock lock space to operate and for air that is sucked upward to flow past. Although air which experiences such suction is expected to be turbulent, this modest volume of air is sufficiently segmented from the rest.

These pieces and their compound curves, like many of the other contoured components, are to be molded in plastic through vacuum forming. They will be assembled around a composite fiberglass panel, this center strake spanning from the top of the airfoil to the underside of the trailer. The strake is secured to the top surface of the airfoil using aluminum angles and rivets. Adhering to the priority of minimal modification to the bumper, this panel is not attached directly to the trailer, but instead supported by a pipe fitted through unused holes in the suspension track 103.

FIG. 9A illustrates how the top form is in two parts fitting around the strake to which they are attached. The bottom form is nested between them, attaching to the underside of the airfoil and covering the gaps created by the hole in its surface. As with many other elements, these contoured pieces attach to other parts of the diffuser rather than the bumper itself. The combination of these components around the central strake adds to the harmony of parts which supplies the diffuser with strength and stability while simultaneously serving an aerodynamic function.

Figure 10B:
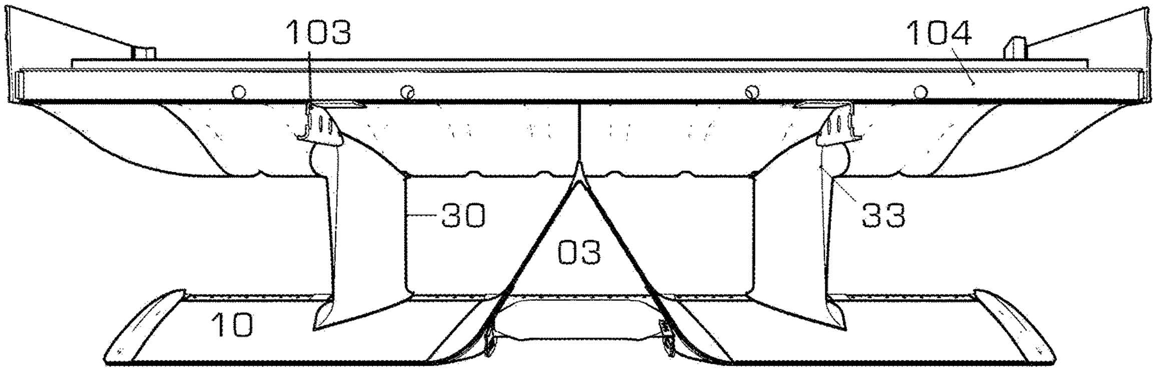
FIG. 10B. Front view of diffuser configuration with strakes angled around central opening.

Rather than shield the center segment from the top and bottom, it may be sufficient to do so from the side, with traditional straight and narrow strakes flanking the gap, as shown in FIG. 10B. This would offer more reliable clearance for the dock lock, but also offer alternative aerodynamic advantages. Whether or not, on balance, this configuration is an improvement, a detriment, or merely equivalent, it is worth considering this possibility, especially in the context of various bumper designs.

Figure 10C:
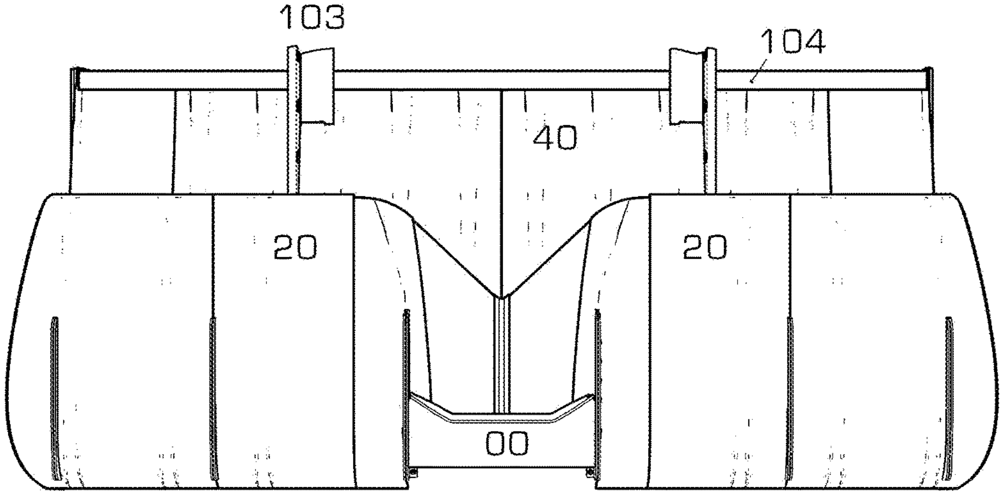
FIG. 10C. Bottom view of diffuser configuration with strakes angled over central opening.

In most respects, the variant of FIG. 10C is very much like the most basic version, but the medial assemblies make it less of an inverted spoiler and more like a traditional diffuser with a true plurality of strakes. The design isolates air on either side, with greater emphasis on drawing air upward instead of limiting flow to upper and lower volumes. Vacuum formed contours constitute the base of the strakes, with sheets of fiberglass extending up to the center, united by another specially molded piece illustrated in FIG. 10A. This upward angle forms a pressure differential, further facilitating airflow into the vacuum.

In no variation can the underside contour improve the transition of airflow past this center segment, as it simply cannot be included except to either side. Where the dock lock would make contact with the bumper, it would crack or crush this piece, no matter its material. Consequently, it may be an advantage allowing air to pass beyond the bumper more directly. One of the main functions of the diffuser is to limit the rush of air into the vacuum. At the middle of the vehicle, it may be worthwhile to permit this.

Given the limited airflow directly behind the suspension, it is preferrable that air flow into this volume so that it may fill the subsequent vacuum. This can be facilitated by suction force through the central gap. Not to mention, the reason upward flow is so detrimental is it spreads turbulence across the volume and disrupts horizontal airflow. In this case, the vertical strakes sufficiently separate this upward flow from the air that is rushing in from the sides of the vehicle.

What is claimed is:

1. A bumper diffuser for a freight vehicle having a rear impact guard, wherein the bumper diffuser comprises:

an airfoil having
an upper surface defining an upper airflow volume above said rear impact guard
a lower surface defining a lower airflow volume below said rear impact guard,
a leading edge defining a foremost extent of the airfoil,
wherein the airfoil forms a forward extension of said rear impact guard,
wherein the airfoil is generally horizontal when used with said freight vehicle.

2. The bumper diffuser of claim 1, wherein said rear impact guard and said airfoil share a substantially similar vertical cross-section, and said airfoil tapers toward the foremost extent such that said leading edge has a substantially smaller vertical cross-section than said rear impact guard.

3. The bumper diffuser of claim 1, wherein the upper surface of said airfoil comprises a directionally flexible sheet of fiber-reinforced plastic using glass fiber extending from a topside of said rear impact guard toward said leading edge.

4. The bumper diffuser of claim 1, wherein the lower surface of said airfoil comprises molded plastic segments extending from said leading edge and arcing beyond an aftmost extent of said rear impact guard.

5. The bumper diffuser of claim 1, wherein said forward extension features a central gap around a bumper dock lock interface.

6. The bumper diffuser of claim 5, wherein said gap defines an aperture, and said aperture is occupied by a coincident fairing with a profile matching that of said forward extension, such that at least one surface of said forward extension is substantially continuous.

7. The bumper diffuser of claim 6, wherein said coincident fairing is rotatably attached to said airfoil, such that said aperture may be open or closed.

8. The bumper diffuser of claim 5, wherein said gap is shrouded by at least one complementary fairing chosen from a group comprising the following surfaces: vertical strake, horizontal splitter, and molded contour.

9. The bumper diffuser of claim 8, wherein said complementary fairing is adjacent to said gap and defines a distinct airflow volume that does not intersect said gap.

10. The bumper diffuser of claim 1, wherein said airfoil has a plurality of rigid runners, and the rigid runners are metal extensions fixedly attached to said rear impact guard and protrude beneath the lower surface of said airfoil.

11. The bumper diffuser of claim 10, wherein said plurality of rigid runners is formed by a plurality of clamps, and said clamps fixedly attach the airfoil to the rear impact guard.

12. The bumper diffuser of claim 11, wherein each of said clamps comprises two clamping surfaces fitting around said rear impact guard and wherein either of said clamping surfaces is fixedly attached to the other such that said clamps are secured to said rear impact guard.

13. The bumper diffuser of claim 12, wherein said clamping surfaces are comprised of at least one piece of the following metals: aluminum and steel.

14. The clamps of claim 11, wherein said clamps form resilient runners protruding beneath the lower surface of said bumper-mounted airfoil.

15. The bumper diffuser of claim 11, wherein said bumper diffuser includes an internal structure, and said clamps form primary mounting surfaces for the internal structure of said bumper, such that said internal structure is not mounted directly to said rear impact guard.

16. The bumper diffuser of claim 15, wherein said internal structure comprises the following:
square tubing and angle stock spanning said clamps, to which the upper and lower surfaces of said airfoil are fixedly attached;
cross-sectional ribs coincident to said upper surface and said lower surface of said airfoil, such that the cross-sectional ribs and the upper and lower surfaces exhibit substantially similar profiles.

17. The bumper diffuser of claim 1, wherein said freight vehicle includes a trailer, said trailer having crossmembers forming an underside of the trailer and a buckplate forming a rear edge of the trailer, wherein said bumper diffuser includes contoured coverings for the underside of the trailer.

18. The bumper diffuser of claim 17, wherein said contoured coverings span at least from a bottom edge of the crossmembers to a bottom edge of the buckplate.

19. The bumper diffuser of claim 17, wherein said contoured coverings span a height greater than that between the bottom edge of the crossmembers and the bottom edge of the buckplate thereby forming a curvature, such that said curvature gradually descends beneath the underside of the trailer and ascends toward the rear edge of the trailer.

20. The bumper diffuser of claim 19, wherein said curvature ascends to the rear edge and an outside edge of said trailer.

21. The bumper diffuser of claim 1, wherein said rear impact quard is attached to said freight vehicle by at least two vertical support members and said bumper diffuser has tapered deflectors covering the vertical support members, such that the tapered deflectors have a narrow leading edge and smooth surfaces surrounding flat flanges of said vertical support members.

22. The bumper diffuser of claim 21, wherein said narrow leading edge and said smooth surfaces are contoured toward a rear vacuum centered behind the trailer.

23. The bumper diffuser of claim 21, wherein said tapered deflectors are substantially similar in size and shape to said vertical support members, such that the smooth surfaces are not of significantly greater extent than the flat flanges.

24. The bumper diffuser of claim 21, wherein said tapered deflectors are fixedly attached to said vertical support members.

25. The bumper diffuser of claim 21, wherein said tapered deflectors are fixedly attached to the contoured coverings for the underside of the trailer, and wherein said tapered deflectors are fixedly attached to the upper surface of said airfoil.

* * * * *